(12) United States Patent
Curtis et al.

(10) Patent No.: US 8,723,833 B2
(45) Date of Patent: May 13, 2014

(54) CAPACITIVE TOUCH SYSTEM WITH NOISE IMMUNITY

(75) Inventors: Keith E. Curtis, Gilbert, AZ (US);
Stephen B. Porter, Gilbert, AZ (US);
Burke T. Davison, Chandler, AZ (US);
Aurelian Floricica-Voicu, Ploiesti (RO)

(73) Assignee: Microchip Technology Incorporated, Chandler, AZ (US)

( * ) Notice: Subject to any disclaimer, the term of this patent is extended or adjusted under 35 U.S.C. 154(b) by 923 days.

(21) Appl. No.: 12/827,592

(22) Filed: Jun. 30, 2010

(65) Prior Publication Data

US 2011/0007028 A1    Jan. 13, 2011

Related U.S. Application Data

(60) Provisional application No. 61/224,975, filed on Jul. 13, 2009.

(51) Int. Cl.
*G06F 3/044* (2006.01)

(52) U.S. Cl.
USPC .................. 345/174; 345/173; 178/18.06

(58) Field of Classification Search
USPC ................. 345/173, 174; 178/18.06
See application file for complete search history.

(56) References Cited

U.S. PATENT DOCUMENTS

| 7,667,947 B2 | 2/2010 | Schilling et al. | 361/290 |
| 2008/0143671 A1 | 6/2008 | Li | 345/156 |
| 2009/0009194 A1 | 1/2009 | Seguine | 324/684 |
| 2010/0283552 A1* | 11/2010 | Colin et al. | 331/143 |

FOREIGN PATENT DOCUMENTS

| CN | 1197555 A | 10/1998 | G06F 3/033 |
| EP | 0818751 A1 | 1/1998 | G06K 11/16 |
| WO | 2009/006556 A1 | 1/2009 | G03F 3/045 |

OTHER PUBLICATIONS

International PCT Search Report and Written Opinion, International Application No. PCT/US2010/041683, 12 pages, Mailed Oct. 18, 2010.
Chinese Office Action, Application No. 201080018220.7, 8 pages, Jan. 27, 2014.

* cited by examiner

*Primary Examiner* — Latanya Bibbins
(74) *Attorney, Agent, or Firm* — King & Spalding L.L.P.

(57) ABSTRACT

Systems and methods for determining a user's touch in a capacitive touch sensor system is provided, including performing a series of potential touch detection tests for a plurality of sensors until a potential touch is detected and measuring a test frequency for one of the sensors, such that a potential touch may be detected when the measured test frequency deviates from a previously measured test frequency for the same sensor. After detecting a potential touch, the method may additionally include performing a series of baseline comparison tests for each of the sensors, for example, measuring a current frequency for one of the sensors, comparing the current frequency to a baseline frequency, and assigning a deviation value based on the comparison the current frequency and the baseline frequency. The method may identify the sensor with the largest deviation value as a touched sensor.

18 Claims, 7 Drawing Sheets

CAPACITIVE TOUCH SYSTEM WITH NOISE IMMUNITY

CROSS-REFERENCE TO RELATED APPLICATIONS

This application claims the benefit of U.S. Provisional Application No. 61/224,975 filed on Jul. 13, 2009, entitled "CAPACITIVE TOUCH SYSTEM WITH NOISE IMMUNITY", which is incorporated herein in its entirety.

TECHNICAL FIELD

The present disclosure relates to capacitive touch sensor systems, and more particularly, to an improved capacitive touch sensor system that uses conducted noise to detect a user's touch so that the user's touch can be detected in the presence or absence of conducted noise.

BACKGROUND

Capacitive touch sensors are used as a user interface to electronic equipment, e.g., computers, mobile phones, personal portable media players, calculators, telephones, cash registers, gasoline pumps, etc. In some applications, opaque touch sensors provide soft key functionality. In other applications, transparent touch sensors overlay a display to allow the user to interact, via touch, with objects on the display. Such objects may be in the form of soft keys, menus, and other objects on the display. The capacitive touch sensors are activated (controls a signal indicating activation) by a change in capacitance of the capacitive touch sensor when an object, e.g., a user's finger tip, causes the capacitance thereof to change.

One way to detect changes in capacitance on a touch sensor utilizes what is known in the art as a relaxation oscillator. The relaxation oscillator drives an oscillating electric signal onto the conductive elements (e.g., sensors) of the touch sensor while a sensing circuit monitors the frequency of oscillation of the driven elements. When an object contacts the touch screen, the resulting change of capacitance causes the frequency of oscillation of the driven elements to change, indicating a touched condition.

One problem associated with using a relaxation oscillator-based capacitive touch sensor is that conducted (common mode) noise present on the power supply connections of a capacitive touch sensor can cause interference, false, triggering, and/or out of range values due to the noise overdriving the capacitive touch relaxation oscillator. When this occurs, frequency shifts may be exaggerated, sensitivity, may be significantly increased, and noise at the unpressed frequency may not be detectable as a frequency shift (e.g., blind spots). Current relaxation oscillator-based capacitive touch sensor systems employ measures to either reduce the conducted noise (e.g., filtering) or limit the system's susceptibility to the conductive noise (e.g., overdriving). However, these approaches have drawbacks. For example, they may require additional or more expensive circuit components.

SUMMARY

In accordance with the teachings of the present disclosure, the disadvantages and problems associated with current approaches to handling conducted noise in a relaxation oscillator-based touch sensor have been substantially reduced or eliminated. More specifically, a system and method are employed wherein the system detects touch by detecting the disruptive actions of conducted noise. Instead of filtering or overdriving to compensate for conducted noise, the system uses the conducted noise to detect touch.

In accordance with one embodiment of the present disclosure, a method for determining a user's touch in a capacitive touch sensor system having a plurality of sensors and a relaxation oscillator is provided. The method may include performing a series of potentials touch detection tests for the plurality of sensors until a potential touch is detected. Each potential touch detection test may involve measuring a test frequency for one of the sensors, such that a potential touch is detected by detecting a deviation between the measured test frequency and a previously measured test frequency for the same sensor. In response to detecting a potential touch, the method may additionally include performing a series of baseline comparison tests for each of the sensors. Each baseline comparison test may involve measuring a current frequency for a particular one of the sensors, comparing the current frequency to a baseline frequency for the particular sensor, and assigning to the particular sensor a deviation value based on the comparison of its current frequency with its baseline frequency. The method may further include determining whether any one of the sensors has been assigned a largest deviation value, and if so, identifying the sensor with the largest deviation value as a touched sensor.

In accordance with another embodiment of the present disclosure, a capacitive touch sensor system may include a touch sensor having a plurality of sensors, a touch controller communicatively coupled to the touch sensor, and a relaxation oscillator circuit as part of the touch controller. The touch controller may be configured to perform a series of potential touch detection tests for the plurality of sensors until a potential touch is detected. Each potential touch detection test may involve measuring a test frequency for one of the sensors, such that a potential touch is detected by detecting a deviation between the measured test frequency and a previously measured test frequency for the same sensor. In response to detecting a potential touch, the touch controller may be further configured to perform a series of baseline comparison tests for each of the sensors. For each baseline comparison test, the touch controller may measure a current frequency for a particular one of the sensors, compare the current frequency to a baseline frequency for the particular sensor, and assign to the particular sensor a deviation value based on the comparison of its current frequency with its baseline frequency. Touch controller may then determine whether any one of the sensors has been assigned a largest deviation value, and if so, identify that sensor as a touched sensor.

BRIEF DESCRIPTION OF THE DRAWINGS

A more complete understanding of the present embodiments and advantages thereof may be acquired by referring to the following description in conjunction with the accompanying drawings, in which like reference numbers indicate like features, and wherein.

DETAILED DESCRIPTION

Preferred embodiments and their advantages over the prior art are best understood by reference to FIGS. 1-9 below, wherein like numbers are used to indicate like and corresponding parts.

Figure 1:
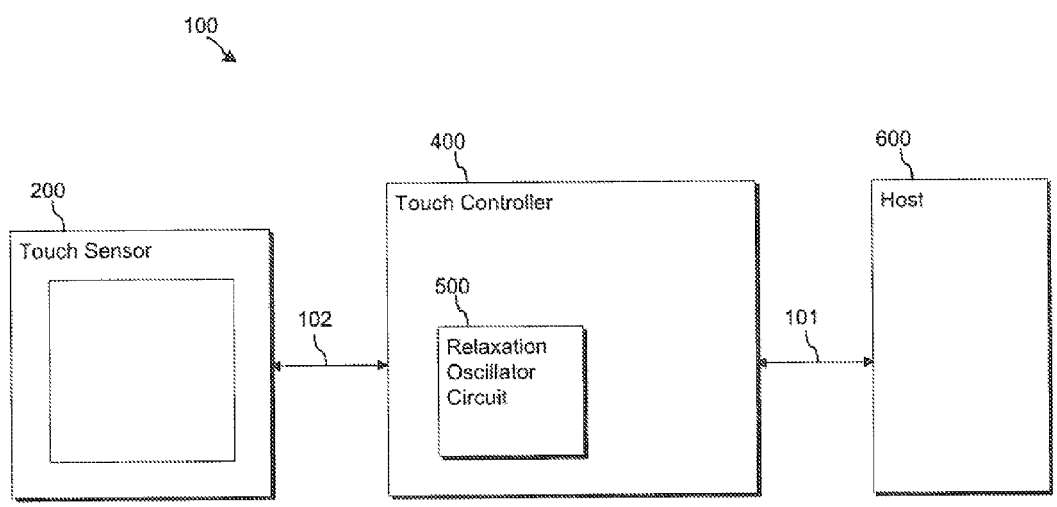
FIG. 1 illustrates a block diagram of an example relaxation oscillator-based touch sensor system that uses conducted noise to detect a touch so that the touch can be detected in the presence or absence of conducted noise, in accordance with the present disclosure.

FIG. 1 illustrates a block diagram of an example relaxation oscillator-based touch sensor system 100 that uses conducted noise to detect a touch so that the touch can be detected in the presence or absence of conducted noise, in accordance with the present disclosure. As depicted in FIG. 1, system 100 may comprise touch sensor 200, touch controller 400, and host 600.

Touch sensor 200 may generally be operable to receive input via contact with a human finger or other hand held object (e.g., stylus, credit card, etc.). In general, touch sensor 200 is configured to recognize a touch event through a change in capacitance that results from the touch event. Touch sensor 200 may include one or more conductive elements that present a natural capacitance to a ground (or virtual ground) plane within touch sensor 200. Touch sensor 200 may be of a semi-transparent construction, allowing it to be placed in front of or integrated into a graphic (video) display system. Alternatively, touch sensor 200 may be of an opaque construction (e.g., touch pad used in many current laptop computers). A more detailed description of an example touch sensor 200 according to the present disclosure is provided in the discussion of FIGS. 2-4 below.

Touch controller 400 may generally be an electronic system operable to detect, measure, and report touch events on touch sensor 200. Touch controller 400 may comprise a relaxation oscillator circuit 500 in the form of an electronic circuit that produces a voltage signal that oscillates between two voltage levels. Touch controller 400 may be implemented as discrete electrical components, as a part of an integrated circuit, or some combination of both. A more detailed description of an example touch controller 400 according to the present disclosure is provided in the discussion of FIGS. 5-7 below.

Host 600 may generally be a system that receives touch reports from touch controller 400. Host 600 may be configured to initiate some action based on such touch reports. In one embodiment, host 600 may correspond to a computer such as a server, desktop, laptop, or tablet computer. According to another embodiment, host 600 may correspond to, any of a variety of electronic devices including, for example, a mobile phone or a digital media (e.g., music, video, etc.) player.

As illustrated in FIG. 1, touch sensor 200, touch controller 400, and host 600 may be communicatively coupled via connections 101 and 102 to form system 100. Connections 101 and 102 may be any type of structure suitable for facilitating the communication of electronic signals, data, and/or messages (generally referred to as data). In addition, touch sensor 200, touch controller 400, and host 600 may communicate via connections 101 and 102 using any suitable communication protocol. In one embodiment, communication over connections 101 and 102 may be in the form of a custom communication protocol. According to another embodiment, communication over connections 101 and 102 may be according to any of a variety of known protocols/bus architectures. For example, such protocols/architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, Universal Serial Bus (USB), Video Electronics Standards Association (VESA) local bus, Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

While touch sensor 200, touch controller 400, and host 600 are depicted as separate blocks in FIG. 1, any physical configuration may be provided. For example, in one embodiment touch controller 400 and host 600 may be implemented as a single integrated circuit. In another embodiment, touch controller 400 and touch sensor 200 may be implemented as a standalone device separate from host 600. In yet another embodiment, touch sensor 200, touch controller 400, and host 600 may be implemented as one physical device with connections 101 and 102 as internal connections within the device. For embodiments including more than one physical device corresponding to touch sensor 200, touch controller 400, and host 600, the physical devices may be physically located at the same location or at remote locations. For example, connection 101 may be the internet and host 600 may be a server computer located many miles away from touch sensor 200 and touch controller 400.

In operation, touch controller 400 may use relaxation oscillator circuit 500 and other circuitry to continually measure, via connection 102, the capacitance value of one or more conductive elements within touch sensor 200. When a user touches touch sensor 200 with a finger or other object, the touch changes the capacitance value at conductive element(s) near the touch location. Touch controller 400 may recognize the changed capacitance and determine that the touch sensor 200 has been touched. In embodiments where touch sensor 200 has more than one conductive element, touch controller 400 may determine the location of the touch or the specific conductive element that was touched. Touch controller 400 may then report the touch touched location to host 600. Host 600 may initiate some action based in whole or in part on the location of the touch.

Figure 2:
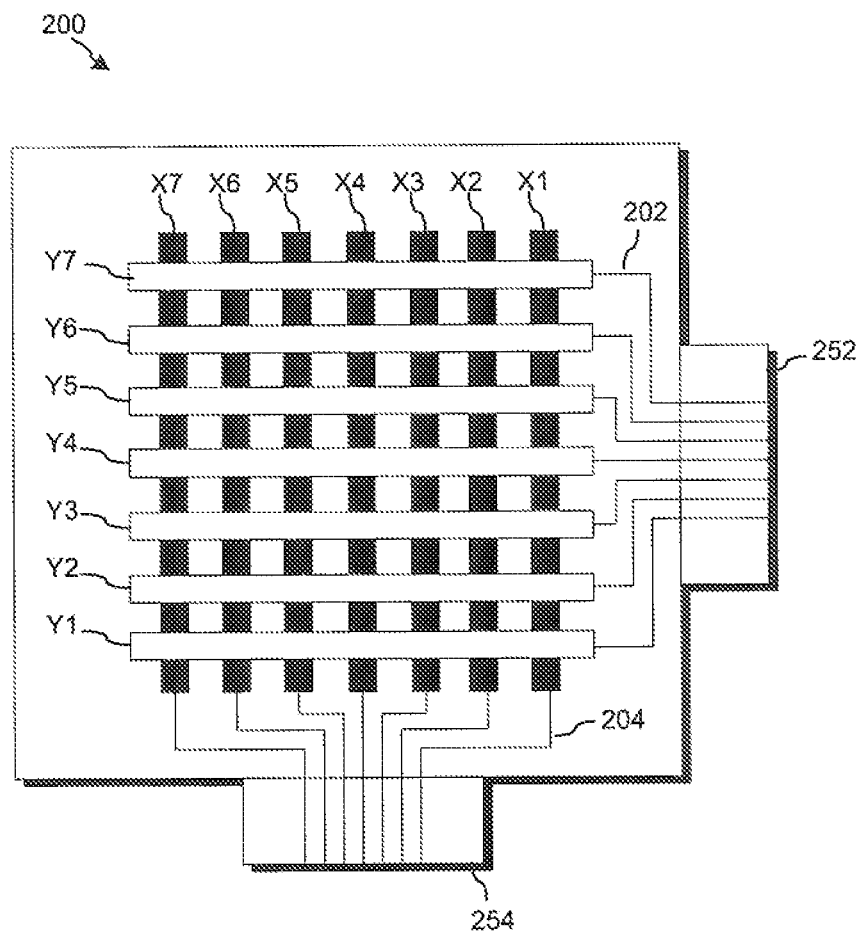
FIG. 2 illustrates a top view of an example touch sensor in a relaxation oscillator-based touch sensor system, in accordance with the present disclosure.

FIG. 2 illustrates a top view of an example touch sensor 200 in a relaxation oscillator-based touch sensor system 100, in accordance with the present disclosure. According to the depicted embodiment, touch sensor 200 may include dielectrically separated conductive elements X1-X7 and Y1-Y7 arranged in a grid pattern and forming a Cartesian coordinate system (x and y) in which each conductive element represents a different x or y coordinate. According to another embodiment, touch sensor 200 may include conductive elements arranged according to a Polar coordinate system or some other coordinate system. In an embodiment having only one conductive element (e.g., a soft button), no coordinate system is required.

Each of conductive elements X1-X7 and Y1-Y7 may be electrically connected via traces 202 and 204 to ports 252 and 254. In the embodiment shown, each conductive element is separately and directly connected to a respective one of ports 252 and 254. According to another embodiment, traces 202 and 204 may be connected directly or indirectly (e.g., with intervening logic) to more than one of conductive elements X1-X7 and Y1-Y7.

Conductive elements X1-X7 and Y1-Y7 may be formed with any suitable conductive medium. In a semi-transparent touch sensor configuration, capacitive elements X1-X7 and Y1-Y7 may be formed with, for example, indium tin oxide (ITO). In an opaque touch sensor configuration, capacitive elements X1-X7 and Y1-Y7 may be formed with, for example, copper.

Ports 252 and 254 may provide an interface to which the touch controller 400 of FIG. 1 may be coupled (via connection 102). While the disclosed embodiment includes one port 252 corresponding to conductive elements Y1-Y7 and a separate port 254 corresponding to conductive elements X1-X7, other embodiments may comprise a single port or more than two ports. In these cases, traces 202 and 204 are routed to the desired port(s).

Figure 3:
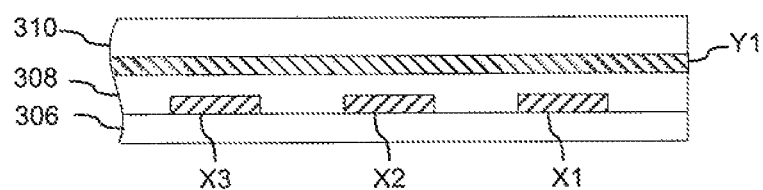
FIG. 3 illustrates a partial cross-section, front elevation view of an example touch sensor in a relaxation oscillator-based touch sensor system, in accordance with the present disclosure.
Figure 4:
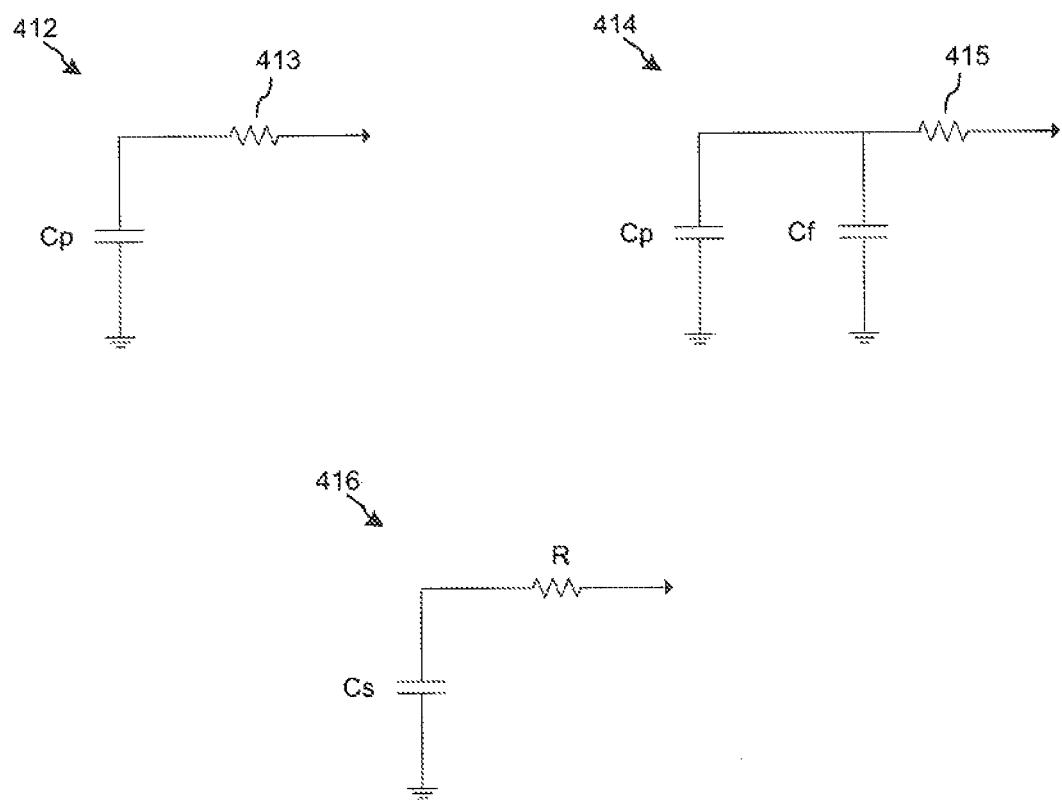
FIG. 4 illustrates electrical circuits corresponding to an example touch sensor in a relaxation oscillator-based touch sensor system, in accordance with the present disclosure.

FIG. 3 illustrates a partial cross-section, front elevation view of an example touch sensor 200 in a relaxation oscillator-based touch sensor system 100, in accordance with the present disclosure. As depicted, touch sensor 200 may comprise substrate layer 306 onto which conductive elements X1-X3 are formed. Insulating layer 308 may dielectrically separate conductive elements X1-X3 from conductive element Y1. Surface layer 310 may be formed on top of conductive element Y1 and provide the input surface of touch screen 200 (i.e., the surface that the user touches with a finger or other object). In a semi-transparent touch sensor configuration, substrate 306 and surface layer 310 may be formed with, for example, glass or clear plastic (e.g., Plexiglas); and insulating layer 308 may be formed with, for example, a clear adhesive or other semi-transparent materials having good insulating characteristics. In an opaque touch sensor configuration, substrate 306 may be formed with, for example, a fiberglass (FR-4) printed circuit board (PCB) material; insulating layer may be formed with, for example, any suitable adhesive or other material having good insulating characteristics; and surface layer 310 may be formed with, for example, glass or plastic.

In operation, the touch sensor 200 illustrated in FIGS. 2 and 3 provide a physical interface through which a user may provide input to touch sensor system 100. Each conductive element X1-X7 and Y1-Y7 has a natural resistance. Each conductive element X1-X7 and Y1-Y7 also has a natural capacitance to a ground (or virtual ground) plane within touch sensor 200. Thus, each conductive element X1-X7 and Y1-Y7 may be used to form an RC circuit such as those depicted in FIG. 4. For example, circuit 412 of FIG. 4 may represent an RC circuit corresponding to an untouched, individual conductive element having a natural resistance depicted as resistor 413 and a natural capacitance Cp.

When a user touches touch sensor 200 with a finger or other object, a second capacitance may be added in parallel to the natural capacitance of the conductive element(s) near the location of touch. This second capacitance is illustrated as capacitance Cf in circuit 414 of FIG. 4. Again, resistor 415 of circuit 414 may correspond to the natural resistance of the conductive element, and capacitance Cp may correspond to the natural capacitance of the conductive element. Parallel capacitances Cp and Cf in circuit 414 may be added together to form a total sensor capacitance (Cs), as depicted in circuit 416. Thus, circuit 416 illustrates an RC circuit that may be formed in the presence of a touch.

As described more fully below, touch controller 400 of FIG. 1, via relaxation oscillator circuit 500, may repeatedly measure the sensor capacitance Cs of each conductive element X1-X7 and Y1-Y7 to determine if a user has touched touch sensor 200. In other words, by repeatedly measuring Cs, touch controller 400 may determine that a user has touched touch screen 200 when the value of Cs increases.

Figure 5:
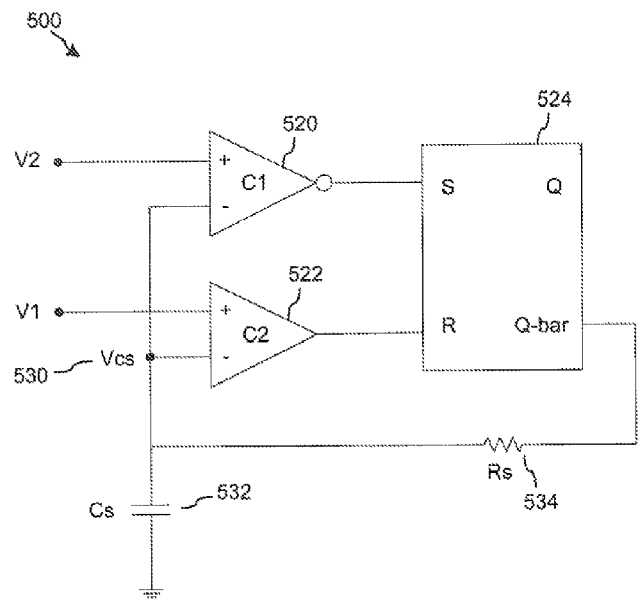
FIG. 5 illustrates an example relaxation oscillator circuit in a relaxation oscillator-based touch sensor system, in accordance with the present disclosure.

FIG. 5 illustrates an example relaxation oscillator circuit 500 in a relaxation oscillator-based touch sensor system 100, in accordance with the present disclosure. According to this embodiment, capacitor 432 having a capacitance Cs and resistor 534 correspond to an RC circuit (e.g., circuit 416) of an individual conductive element X1-X7 or Y1-Y7. This RC circuit may be connected to comparators 520 and 522 and SR latch 524. As depicted, voltage Vcs at node 530 may correspond to the voltage across sensor capacitor 532. Voltage Vcs at node 530 may be used as the inverting input to both comparators 520 and 522. The non-inverting input of comparator 520 may be connected to voltage V2, and the non-inverting input of comparator 522 may be connected to voltage V1. In this embodiment, voltage V2 is greater than voltage V1.

The output of comparator 520 may be inverted and connected to the S input of SR latch 524. The output of comparator 522 may be connected to the R input of SR latch 524. The inverted output of SR latch 524 (i.e., Q-bar output) may be connected to the RC circuit formed by one of conductive elements X1-X7 or Y1-Y7.

In operation, relaxation oscillator circuit 500 may be used to create a window of operation in which the voltage Vcs at node 530 is cyclically charged to voltage level V2 and discharged to voltage level V1. Relaxation oscillator circuit 500 may achieve this function in the following manner. First, if the voltage at node 530 (i.e., the voltage across capacitor 532) drops below voltage V1, the output of comparator 522 will go HIGH. Similarly, if the voltage at node 530 rises above voltage V2, the output of comparator 520 will go LOW (because of the inverted output). Next, comparator outputs are connected to SR latch 524, which behaves according to the truth table in TABLE 1.

TABLE 1

| S | R | Q | Q-bar | Operation |
|---|---|---|---|---|
| 0 | 0 | HOLD (output holds last known value) | | |
| 0 | 1 | 0 | 1 | RESET |
| 1 | 0 | 1 | 0 | SET |
| 1 | 1 | 0 | 1 | RESET |

Thus, if the SET (S) input of SR latch 524 is driven HIGH, the Q-bar output of the latch will be driven LOW. If the RESET (R) input of latch 524 is driven HIGH, the Q-bar output of the latch will be driven HIGH. SR latch 524 may be a reset-dominant latch so that when both the S and R inputs are driven HIGH, SR latch 524 will be in RESET mode (i.e., Q-bar output will be driven HIGH). Finally, where both S and R inputs are driven LOW, the outputs of SR latch 524 will hold the last known output value.

Figure 6:
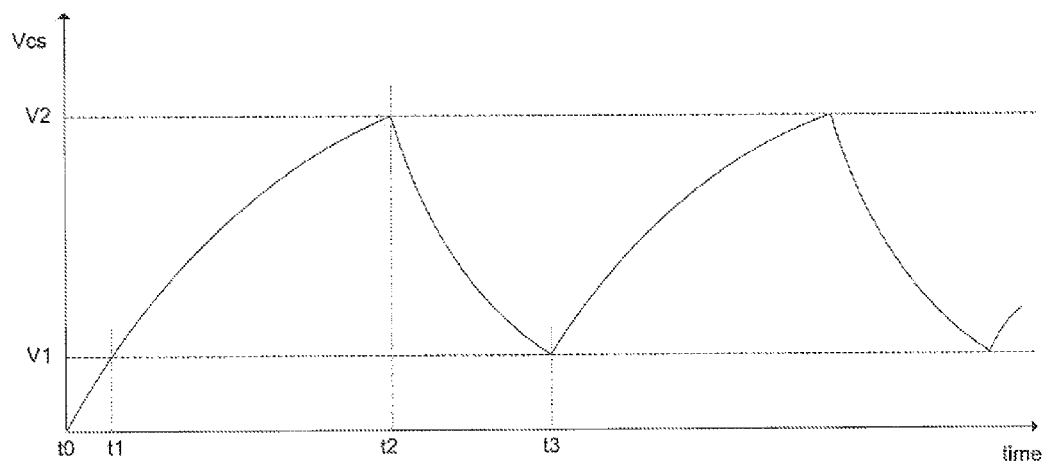
FIG. 6 illustrates an example timing diagram for a relaxation oscillator circuit output in a relaxation oscillator-based touch sensor system, in accordance with the present disclosure.

FIG. 6 illustrates an example timing diagram for a relaxation oscillator circuit 500 output in a relaxation oscillator-based touch sensor system 100, in accordance with the present disclosure. FIG. 6, along with FIG. 5 and TABLE 1, further describes the function of relaxation oscillator circuit 500.

Starting with the very beginning of operation (i.e., device power-up), at time t0 in FIG. 6, the voltage Vcs across the sensor capacitor 532 is 0. Therefore, comparator 522 output goes HIGH while the inverted output of comparator 520 goes LOW since both inverting inputs are less than the non-inverting input voltages V2 and V1, respectively. This places SR latch 524 into RESET, driving the Q-bar output to 1, which in turn charges the sensor capacitor 532.

At time t1 depicted in FIG. 6, the voltage Vcs across sensor capacitor 532 increases until it surpasses voltage threshold V1 present on the non-inverting input of comparator 522. This causes the output of comparator 522 to go to 0. Thus, at time t1, both comparator outputs are LOW and the SR latch 524 output holds the last known value, which means that the Q-bar output remains at 1 and continues to charge sensor capacitor 532 (between time t1 and t2).

At time t2, the voltage Vcs across sensor capacitor 532 exceeds voltage threshold V2 present on the non-inverting input of comparator 520. This causes the inverted output of comparator 520 to transition to 1. Thus, at time t2, the S input of SR latch 524 is HIGH, and the R input of SR latch 524 is LOW. This causes the Q-bar output of SR latch 524 to transition to 0. At this time (t2), sensor capacitor 532 begins to discharge (between time t2 and t3). When voltage Vcs drops below voltage threshold V2 (between time t2 and t3), the output of comparator 520 again goes LOW, and SR latch 524 holds the last known value (i.e., 0) and allows capacitor 532 to continue to discharge.

At time t3, the voltage Vcs across sensor capacitor 532 drops below voltage threshold V1. This causes comparator 522 output to go to 1, driving the Q-bar output of SR latch 524 HIGH and again charging sensor, capacitor 532. This charging and discharging process repeats as long as there is power to the system.

The timing of the above-described function of relaxation oscillator circuit 500 may be affected by the electrical properties of the RC circuit formed by each conductive element X1-X7 and Y1-Y7 of touch sensor 200 (FIG. 2). For example, RC circuit 416 of FIG. 4 (corresponding to capacitor 532 and resistor 534 in FIG. 5), like all other RC circuits, may have an RC time constant corresponding to the amount of time necessary to charge capacitor Cs. The RC time constant is typically represented by the Greek letter Tau, and satisfies the following equation:

$$\tau = R * Cs$$

According to this equation, $\tau$ represents the time it takes to charge capacitor Cs to about 63% of the supply voltage, and 5$\tau$ represents the time it takes to charge capacitor Cs to within 1% of the supply voltage. According to the equation, charging time is directly proportional to capacitance Cs. As a result, the sensor capacitance Cs with no touch will charge and discharge more quickly than it does when a touch occurs. In other words, because a touch may increase the capacitance Cs of the RC circuit, the RC time constant may also be increased, and may result in longer charging and discharging periods. Longer charging and discharging periods, in, turn, may result in a reduced frequency of relaxation oscillation circuit 500.

Figure 7:
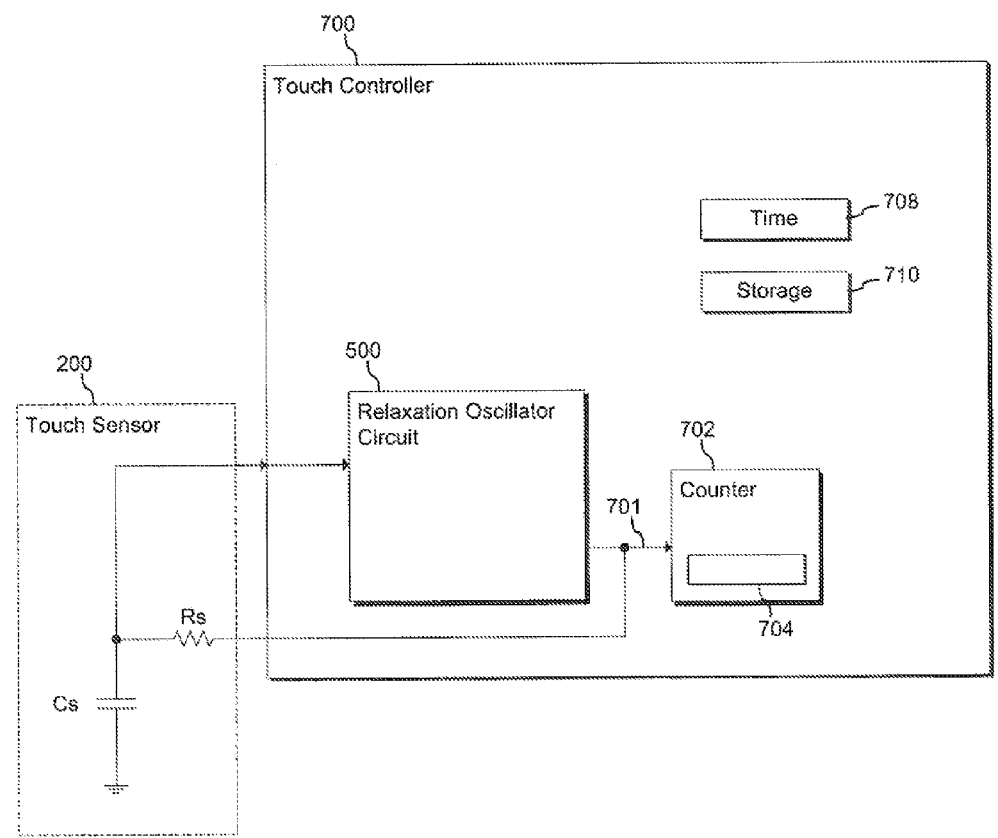
FIG. 7 illustrates an example touch controller in a relaxation oscillator-based touch sensor system, in accordance with the present disclosure.

Given these properties of relaxation oscillator circuit 500, touch controller 400 may determine a touched condition by measuring the frequency of relaxation oscillator circuit 500. FIG. 7 illustrates an example touch controller 700 (corresponding to touch controller 400 of FIG. 1) and provides further details regarding how the frequency of relaxation oscillator circuit 500 may be measured. For example, touch controller 700 may implement counter circuit 702 that is connected to output 701 of relaxation oscillator circuit 500 (i.e., the Q-bar output of SR latch 524 in FIG. 5). Counter circuit 702 may be operable to increment a value stored in counter register 704 on every positive edge of the output 701.

According to one embodiment, which is referred to herein as a "frequency measurement method," touch controller 700 may read the counter register 704 at regular, pre-defined time intervals, for example, according to a pre-defined timer interrupt. Touch controller 700 may compare successive reads of counter register 704 to determine the number of times relaxation oscillator circuit 500 has oscillated during the pre-defined time interval. Accordingly, this number provides a measurement related to the frequency of relaxation oscillator circuit 500. Touch controller 700 may compare successive measurements to determine whether a touch event has occurred.

As described above, a touch may increase the capacitance Cs at capacitor 706, resulting in a reduced frequency of relaxation oscillator circuit 500. Thus, according to the frequency measurement method, if the value of counter register 704 decreases from one pre-defined time interval to the next, touch controller 700 may determine that a touch event has occurred. In some embodiments, touch controller 700 may not determine that a touch event has occurred unless the value of counter register 704 has decreased more than a pre-determined threshold. In such embodiments, touch controller 700 may be less prone to falsely reporting a touch event as a result of minor changes in the frequency of relaxation oscillator 500 due to conditions other than a touch event (e.g., noise, drift, etc.).

In another embodiment, which is referred to herein as a "period measurement method," touch controller 700 may count the time (or period) needed to fill up counter register 704. According to this period measurement embodiment, touch controller 700 may include a system time register 708. Touch controller 700 may reset the value of counter register 704 to ZERO and, at the same or substantially same time, may store the current value of system time register 708 into storage register 710. Here again, counter register 704 may increment on every positive edge of output 701 of relaxation oscillator circuit 500. At some point, this may cause an overflow condition of counter register 704. Touch controller 700 may be configured to respond to an overflow condition of counter register 704 (e.g., via an interrupt) by reading the value of system time register 708 and comparing that value to the time value stored in storage register 710. This comparison provides the number of system time units needed to overflow the counter, and is an indication of the frequency of relaxation oscillator circuit 500.

As described above, a touch may increase the capacitance Cs at capacitor 706, resulting in a reduced frequency of relaxation oscillator circuit 500. Thus, according to the period measurement method, if the number of system time units needed to overflow counter register 704 increases between successive measurements, touch controller 700 may determine that a touch event has occurred. In some embodiments, touch controller 700 may not determine that a touch event has occurred unless the number of system time units taken to overflow counter register 704 has increased more than a predetermined threshold. In such embodiments, touch controller 700 may be less prone to falsely reporting a touch event as a result of minor changes in the frequency of relaxation oscillator circuit 500 due to conditions other than a touch event (e.g., noise, drift, etc.)

According to the frequency measurement method, the sampling window may be adjusted by modifying the length of the pre-defined timer interrupt. According to the period measurement method, the sampling window may be adjusted by changes in the maximum value of the counter register. For example, a small maximum value will result in a shorter sampling window and more frequent frequency measurements. The ratio between the speed of the scanning mechanism and the resolution of system 100 must always be considered when adjusting the sampling window.

As discussed above with respect to FIGS. 1-7, the frequency of relaxation oscillator circuit 500 may be disturbed when a user touches touch screen 200 with a finger or other object. In addition, the frequency of relaxation oscillator circuit 500 may be disturbed by conducted noise that is present in system 100. In either case, there is a deviation in the measured frequency of relaxation oscillator circuit 500 (e.g., the measured frequency changes between successive sampling windows). Accordingly, touch controller 400 must be able to distinguish between three different scenarios.

First, scenario A may correspond to the condition where only a touch event affects the frequency of relaxation oscillator circuit 500. In scenario A, no conducted noise is present, and as described above with respect to FIG. 7, the frequency deviation may tend to be constant and relatively easy to detect. Second, scenario B may correspond to the condition where only conducted noise affects the frequency of relaxation oscillator circuit 500. In scenario B, there is no touch event. Third, scenario C may correspond to the condition where both a touch event and conducted noise affect the frequency of relaxation oscillator circuit 500.

In both scenarios B and C, the frequency of relaxation oscillator 500 may be easily overpowered by the frequency of the conducted noise. As a result, the frequency of relaxation oscillator 500 may be close or equal to the frequency of the conducted noise. This new frequency presents a deviation from the natural frequency of relaxation oscillator circuit 500. Compared to the natural frequency, this deviation may be multiple orders of magnitude or zero. Thus, touch controller 400 may be configured to accurately report a touch event in the presence or absence of such deviations. Likewise, touch controller 400 may be configured to not report a touch event when a frequency deviation is caused by conducted noise alone (scenario B).

Accordingly, touch controller 400 may be configured to exploit one or more properties of the conducted noise in order to accurately detect a touch event. For example, conducted noise in touch sensor system 100 will generally affect each conductive element X1-X7 and Y1-Y7 of touch sensor 200 causing, for each conductive element, a frequency deviation that is similar in magnitude to that experienced by all the other conductive elements. Thus, while all conductive elements may experience a similar frequency deviation in the presence of conducted noise, a touched conductive element will show a deviation that is higher in magnitude, compared to the untouched conductive elements. In both scenarios A and C, the touched conductive element will likely be the one showing the greatest deviation. As a result, touch controller may detect a touched conductive element in all scenarios by searching for a "most pressed button," i.e., the conductive element showing the greatest frequency deviation relative to all other conductive elements.

Notwithstanding the above, scenarios B and C may present a situation in which the conducted noise creates dead frequencies (i.e., blind spots). This situation may be presented, for example, when the frequency of the conducted noise has a value near or equal to the natural frequency of relaxation oscillator circuit 500. When this occurs, touch controller 400 may fail to detect a touch event because the measured frequency does not show a deviation. In order to detect a touch event under these conditions, relaxation oscillator circuit 500 may be configurable to operate according to more than one operating range. According to this aspect of the disclosure, relaxation oscillator circuit 500 may produce an output signal at more than one drive current, where a higher drive current results in a natural frequency that is greater than the natural frequency resulting from a lower drive current.

Thus, for each conductive element X1-X7 and Y1-Y7, touch controller 400 may measure the frequency of relaxation oscillator circuit 500 at two different drive currents (operating ranges). Deviations caused by conducted noise in scenarios B and C may be detected if a deviation at either operating range is detected. According to this embodiment of the present disclosure, touch controller 400 may detect a touch event based on a measurement at one operating range while a measurement at the other operating range shows no deviation as a result of a blind spot.

Figure 8:
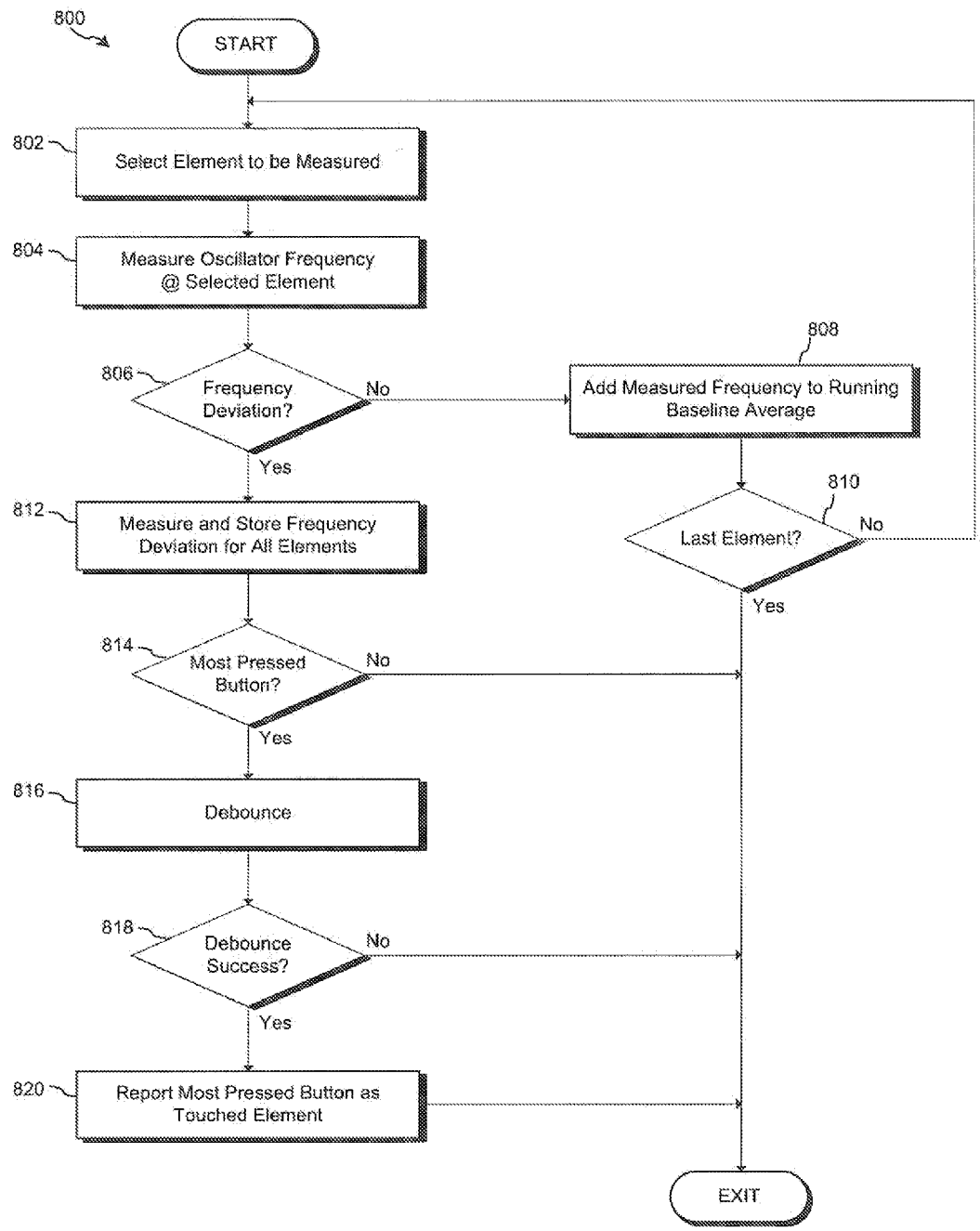
FIG. 8 illustrates a flow chart of an example method for using conducted noise to detect a touch on a touch sensor in a relaxation oscillator-based sensor system, in accordance with the present disclosure.

FIG. 8 illustrates a flow chart of an example method 800 for using conducted noise to detect a touch on a touch sensor 200 in a relaxation oscillator-based sensor system 100, in accordance with the present disclosure.

According to one embodiment, method 800 preferably begins at step 802. As noted above, teachings of the present disclosure may be implemented in a variety of configurations of system 100. As such, the preferred initialization point for method 800 and the order of the steps 802-820 comprising method 800 may depend on the implementation chosen.

At step 802, touch controller 400 may select a conductive element of touch sensor 200 to be measured. For example, touch controller may set a control signal that electrically connects a selected element X1-X7 or Y1-Y7 to relaxation oscillator circuit 500. At step 804, touch controller 400 may measure the frequency of relaxation oscillator circuit 500 according to the methods described above. For example, touch controller 400 may use the frequency measurement method or the period measurement method to measure the frequency of relaxation oscillator circuit 500.

At step 806, touch controller 400 determines whether the measured frequency indicates a deviation from the natural frequency of relaxation oscillator circuit 500. In order to do this, touch controller may store a running baseline average representing the average frequency of a given conductive element. This running baseline average may be used to eliminate noise created by changes in temperature, voltage, and environment. Accordingly, touch sensor 400 may compare the measured frequency with the baseline average. In one embodiment, touch controller 400 determines that a deviation is present if the frequency measurement is different than the baseline average. In another embodiment, touch controller 400 determines that a deviation is present if the frequency measurement differs from the baseline average more than a pre-defined threshold value.

If no frequency deviation is detected at step 806 (i.e., at either operating range of relaxation oscillator circuit 500), touch controller 400 determines that no touch is present and proceeds to step 808. At step 808, touch controller 400 may add the measured frequency to the running baseline average. Thus, the baseline averaging system may be a "gated" system, so that the system keeps track of the presence/absence of noise in any operating range, and disables the baseline averaging whenever noise affects even a single sensor. This ensures that the baseline average reflects the natural frequency of relaxation oscillator circuit 500 rather than the frequency as affected by conducted noise. Further, a fairly slow averaging method (e.g., step 808 is not performed for every scanning cycle) may be implemented if avoiding averaging deviations with a slow slope is desired (e.g., as would be present when an object approaches touch screen 200 very slowly).

After step 808 is complete, touch controller 400 may proceed to step 810 where it may determine if the currently selected conductive element is the last element to be measured. If the currently selected conductive element is the last element to be measured, method 800 may exit. If the currently selected conductive element is not the last element to be measured, method 800 may loop back to step 802 where the next conductive element is selected, and the previous steps repeated for the newly selected conductive element.

Turning back to step 806, if a frequency deviation is detected in this step, touch controller 400 proceeds to step 812 where it measures and stores the frequency deviations for all conductive elements X1-X7 and Y1-Y7. For example, touch controller 400 may loop through steps similar to steps 802 and 804 in order to measure these frequency deviations. According to one embodiment, touch controller 400 may measure the frequency of each conductive element once. According to another embodiment, step 812 may correspond to an acquisition window during which touch controller measures and stores frequency deviations based on multiple measurements, or an average of multiple measurements, for each conductive element X1-X7 and Y1-Y7. According to this latter embodiment, touch controller 400 may employ slope detection during the acquisition window of step 812 to determine when the user is finished touching the touch sensor. For example, as describe more fully below with respect to FIG. 9, touch controller may wait for the frequency to settle (i.e., the slope flattens), before detecting a completion of a touch.

Figure 9:
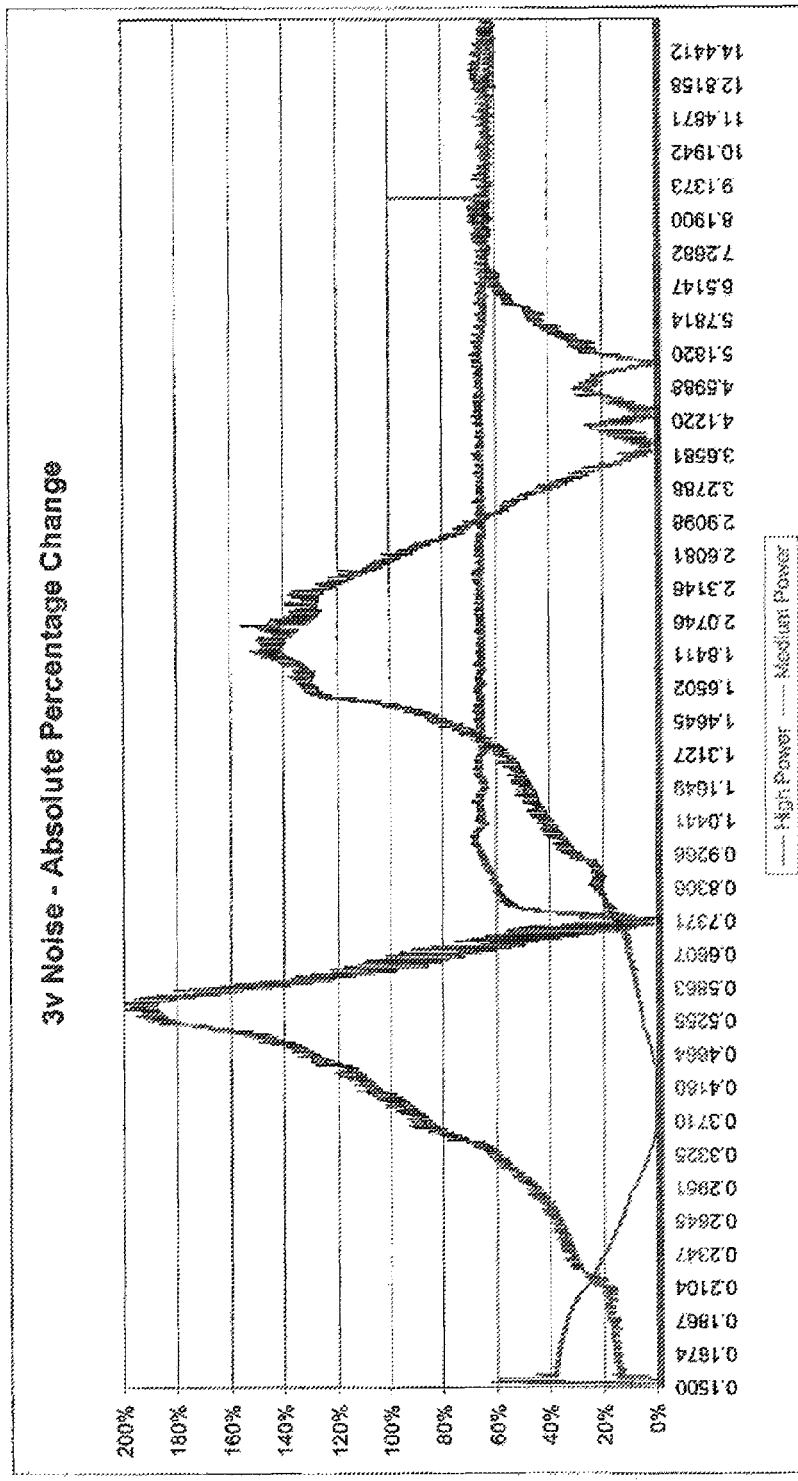
FIG. 9 illustrates an example plot of the percentage change in measured frequency of a conductive element in the presence of conducted noise, in accordance with the present disclosure.

FIG. 9 illustrates an example plot 900 of the percentage change in measured frequency of a conductive element in the presence of conducted noise, in accordance with the present disclosure. As depicted, plot 900 represents the injected noise frequency in megahertz (MHz). The frequency measurements according to two operating ranges (High Power and Medium Power) are depicted. The plotted curve having a peak that occurs earlier in frequency corresponds to the High Power operating range. As illustrated by the frequency response in plot 900, if noise is being injected on the system at 418 KHz (0.4180 on the x-axis), a medium power scan of the sensor may result in the same value (e.g., approximately 0% absolute percentage change) whether or not the user is pressing the sensor. A high power scan of the sensor at 418 KHz (0.4180 on the x-axis), may result in a 110% absolute percentage change if a user is pressing on the sensor. Because current operating ranges may have frequencies that result in little or no change when a user presses the sensor, method 800 may be performed using at least two operating ranges that do not share 0% shift frequencies. According to one embodiment, the percentage change is calculated in absolute value, as the frequency of the conducted noise may take a value higher or lower than the natural frequency of relaxation oscillator circuit 500. In an alternative embodiment, the raw percentage change may be calculated and/or measured.

After touch controller 400 has measured and stored frequency deviations for all conductive elements of touch sensor 200, touch controller may proceed to step 812. At step 812, touch controller 400 may determine whether a most pressed button exists. For example, touch controller 400 may employ a sorting procedure such that a conductive element having the highest deviation compared to all other conductive elements is determined to be the most pressed button. According to one embodiment of the sorting procedure, the most pressed button must reveal a deviation larger than the other conductive elements by at least a predefined threshold. Accordingly, if touch controller 400 does not determine a most pressed button at step 812, method 800 may exit. This would likely be the case in scenario B where the measured deviations were due to noise only and not a touch event. Alternatively, if touch controller 400 determines a most pressed button at step 812, touch controller 400 may proceed to step 816.

At step 816, touch controller 400 may debounce the most pressed button for a number of times in an effort to check for consistency and to avoid false triggers. Touch controller 400 may then determine at step 818 whether the most pressed button has been successfully debounced. If not, method 800 may exit. If so, touch controller 400 may proceed to step 820 where it may report to host 600 (or other application) the most pressed button and exit.

As described above, touch controller 400 may measure the frequency of relaxation oscillator circuit 500 at two different drive currents (operating ranges). Accordingly, all conductive elements X1-X7 and Y1-Y7 of touch sensor 200 may be scanned alternatively according to one operating range and then the other. As a result of this embodiment of the present disclosure, a mirror-like system and method may be implemented where there are similar functions and variables belonging to each of the two operating range modes. For example, method 800 may be performed once at one operating range and then again at another operating range.

Although FIG. 8 discloses a particular number of steps to be taken with respect to method 800, method 800 may be executed with greater or lesser steps than those depicted in FIG. 8. In addition, although FIG. 8 discloses a certain order of steps to be taken with respect to method 800, the steps comprising method 800 may be completed in any suitable order. For example method 800 may be used in conjunction with standard capacitive touch detection methods currently used in the industry. According to this aspect of this disclosure, the method may determine whether conducted noise is present in the touch system (e.g., step 806 of method 800). If conducted noise is present, the method may proceed according to the disclosed steps of method 800. If conducted noise is not present, the method may determine the user's touch using standard capacitive touch detection methods currently used in the industry.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of disclosure.

What is claimed is:

1. A method for determining a user's touch in a capacitive touch sensor system having a plurality of sensors and a relaxation oscillator, comprising:

performing a series of potential touch detection tests for the plurality of sensors until a potential touch is detected, wherein each potential touch detection test involves measuring a test frequency for one of the sensors, and wherein a potential touch is detected by detecting a deviation between the measured test frequency and a previously measured test frequency for the same sensor, wherein each potential touch detection test involves measuring the frequency of the relaxation oscillator for one of the sensors; and each potential touch detection test is performed twice, including operating the relaxation oscillator with a first drive current during a first potential touch detection test and with a second drive current during a second potential touch detection test;

in response to detecting a potential touch, performing a series of baseline comparison tests for each of the sensors, wherein each baseline comparison test involves:
measuring a current frequency for a particular one of the sensors;
comparing the current frequency to a baseline frequency for the particular sensor; and
assigning to the particular sensor a deviation value based on the comparison of its current frequency with its baseline frequency;
determining whether any one of the sensors has been assigned a largest deviation value; and
if one of the sensors has been assigned a largest deviation value, identifying that sensor as a touched sensor.

2. The method according to claim 1 wherein the current frequency of each of the sensors is compared to the corresponding baseline frequency only after the current frequency remains substantially constant for a predetermined number of measurements.

3. The method according to claim 1 wherein the baseline frequency for a particular sensor comprises a running average of a predetermined number of previous frequency measurements for the same sensor.

4. The method according to claim 3 wherein the baseline frequency for a particular sensor comprises a gated running average.

5. The method according to claim 1 wherein a first sensor has been assigned a largest deviation value and a second sensor has been assigned a second-largest deviation value, and wherein the first sensor is identified as the touched sensor only if the largest deviation value exceeds the second-largest deviation value by a predetermined threshold.

6. The method according to claim 1 wherein the measured test frequency is determined according to a frequency measurement method.

7. The method according to claim 1 wherein the measured test frequency is determined according to a period measurement method.

8. The method according to claim 1 wherein the measured current frequency is determined according to a frequency measurement method.

9. The method according to claim 1 wherein the measured current frequency is determined according to a period measurement method.

10. A capacitive touch sensor system comprising:
a touch sensor having a plurality of sensors;
a touch controller communicatively coupled to the touch sensor, the touch controller comprising a relaxation oscillator circuit and configured to perform a series of potential touch detection tests for the plurality of sensors until a potential touch is detected, wherein each potential touch detection test involves measuring a test frequency for one of the sensors, and wherein a potential touch is detected by detecting a deviation between the measured test frequency and a previously measured test frequency for the same sensor, wherein each potential touch detection test involves measuring the frequency of the relaxation oscillator for one of the sensors; wherein the relaxation oscillator is configured to operate according to a first drive current and a second drive current; and wherein the touch controller is further configured to perform each potential touch detection test twice, such that the relaxation oscillator is configured to operate according to the first drive current in a first potential touch detection test and according to the second drive current in a second potential touch detection; and in response to detecting a potential touch, the touch controller further configured to:
perform a series of baseline comparison tests for each of the sensors so that for each baseline comparison test, the touch controller:
measures a current frequency for a particular one of the sensors;
compares the current frequency to a baseline frequency for the particular sensor; and
assigns to the particular sensor a deviation value based on the comparison of its current frequency with its baseline frequency;
determine whether any one of the sensors has been assigned a largest deviation value; and
if one of the sensors has been assigned a largest deviation value, identify that sensor as a touched sensor.

11. A capacitive touch sensor system according to claim 10, wherein the current frequency of each of the sensors is compared to the corresponding baseline frequency only after the current frequency remains substantially constant for a predetermined amount of time.

12. A capacitive touch sensor system according to claim 10, wherein the baseline frequency for a particular sensor comprises a running average of a predetermined number of previous frequency measurements for the same sensor.

13. A capacitive touch sensor system according to claim 12, wherein the baseline frequency for a particular sensor comprises a gated running average.

14. A capacitive touch sensor system according to claim 10, wherein the touch controller is further configured to assign a largest deviation value to a first sensor and a second-largest deviation value to a second sensor, and wherein the touch controller identifies the first sensor as the touched sensor only if the largest deviation value exceeds the second-largest deviation value by a predetermined threshold.

15. A capacitive touch sensor system according to claim 10 wherein the touch controller is configured to measure the test frequency for one of the sensors according to a frequency measurement method.

16. A capacitive touch sensor system according to claim 10 wherein the touch controller is configured to measure the test frequency for the one of the sensors according to a period measurement method.

17. A capacitive touch sensor system according to claim 10 wherein the touch controller is configured to measure the current frequency for the particular one of the sensors according to a frequency measurement method.

18. A capacitive touch sensor system according to claim 10 wherein the touch controller is configured to measure the current frequency for the particular one of the sensors according to a period measurement method.

* * * * *